Figure 1:
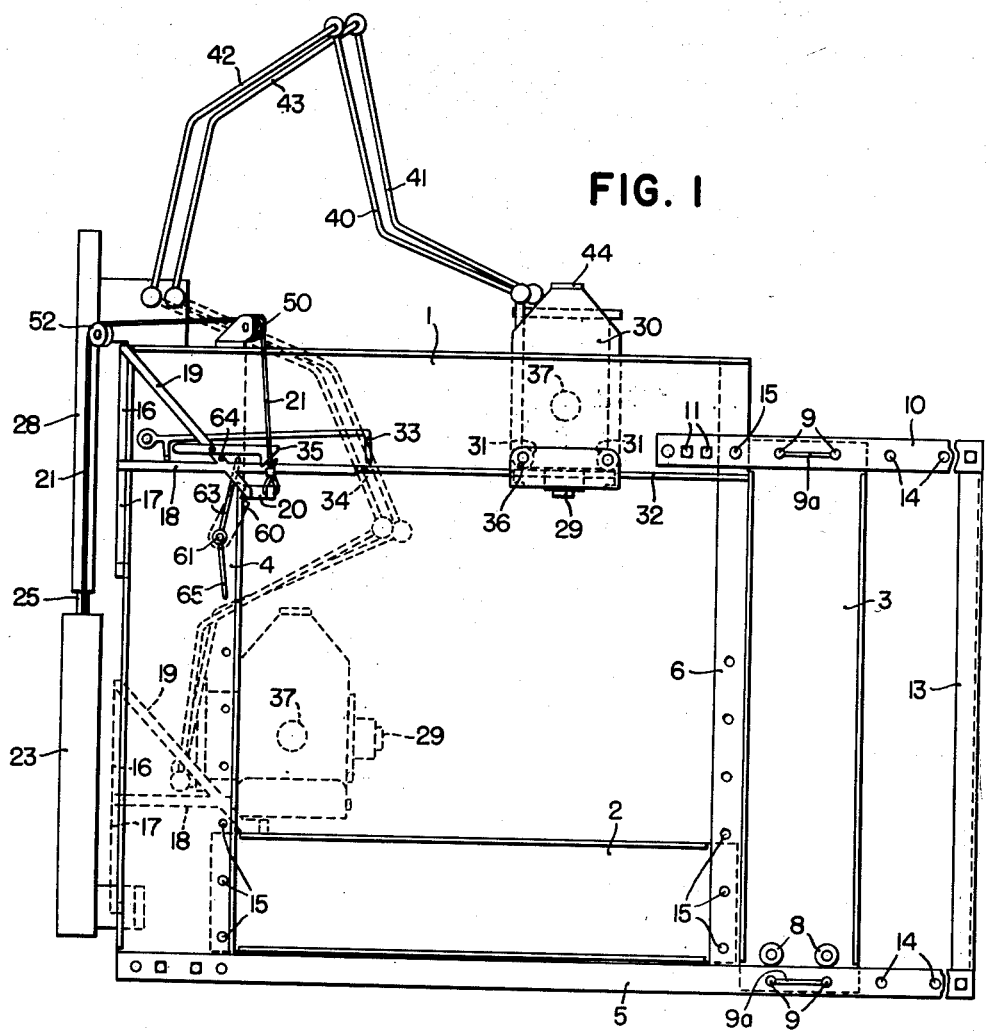

Jan. 11, 1955

C. A. ADAMS 2,699,108

SHOP APPARATUS FOR EXERTING PRESSURE IN DIVERSE DIRECTIONS

Filed Dec. 7, 1950

4 Sheets-Sheet 1

INVENTOR.
C. A. ADAMS
BY
Merrill M. Blackburn,
ATTORNEY

Jan. 11, 1955
C. A. ADAMS
2,699,108
SHOP APPARATUS FOR EXERTING PRESSURE IN DIVERSE DIRECTIONS
Filed Dec. 7, 1950
4 Sheets-Sheet 2
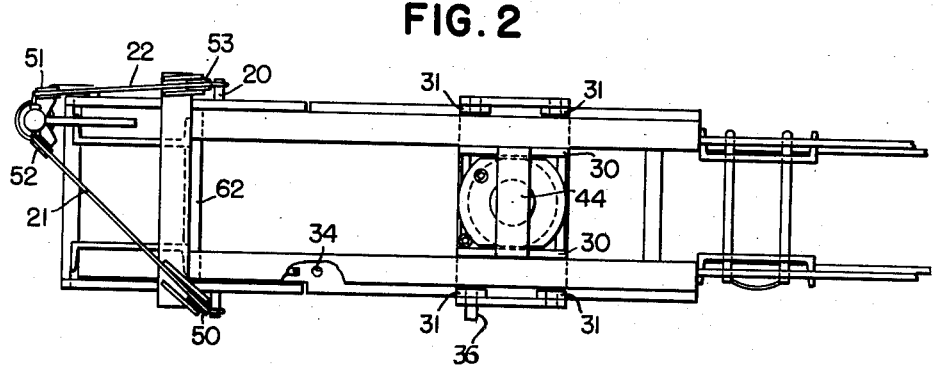
FIG. 2
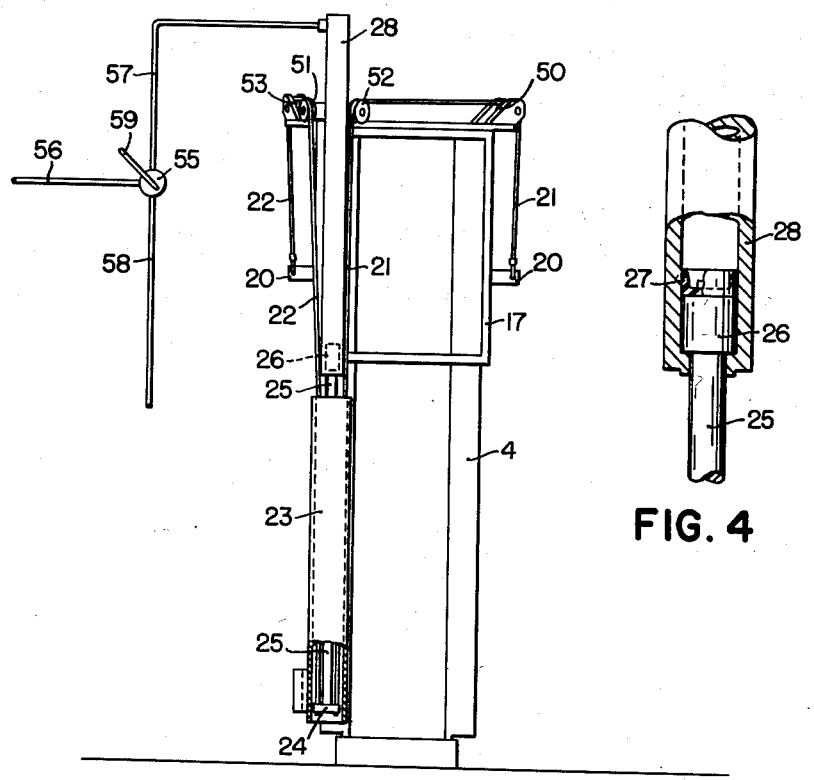
FIG. 3
FIG. 4
INVENTOR.
C. A. ADAMS
BY
Merrill M. Blackburn,
ATTORNEY

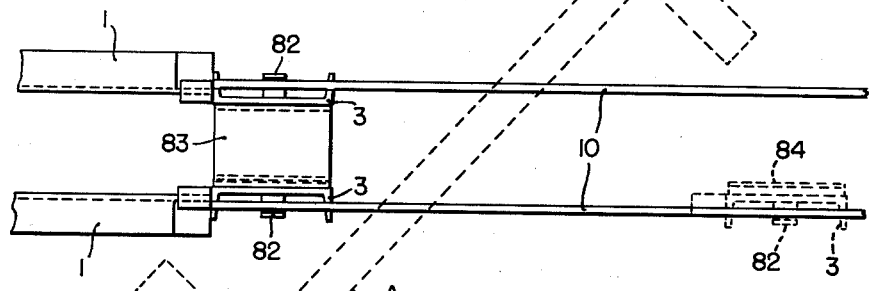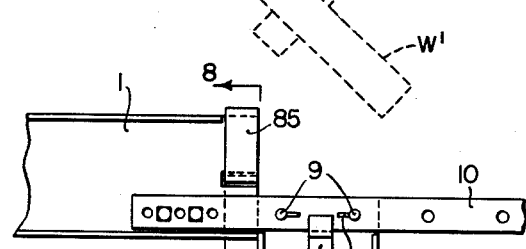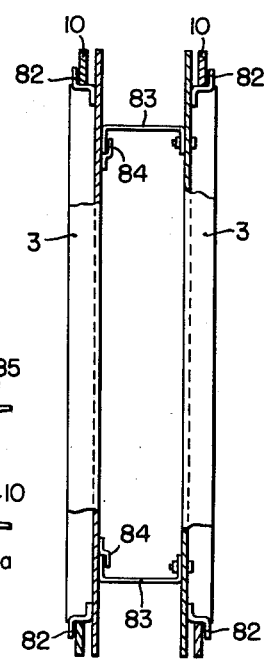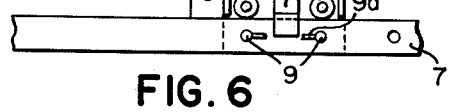

Jan. 11, 1955        C. A. ADAMS        2,699,108
SHOP APPARATUS FOR EXERTING PRESSURE IN DIVERSE DIRECTIONS
Filed Dec. 7, 1950        4 Sheets-Sheet 4

*INVENTOR.*
CHARLES A. ADAMS
BY
Merrill M. Blackburn
ATTORNEY

United States Patent Office 2,699,108
Patented Jan. 11, 1955

2,699,108

SHOP APPARATUS FOR EXERTING PRESSURE IN DIVERSE DIRECTIONS

Charles A. Adams, Davenport, Iowa

Application December 7, 1950, Serial No. 199,661

8 Claims. (Cl. 100—226)

My present invention relates to improvements in pressure mechanism and particularly to presses which can be utilized for exerting either vertical or horizontal pressure. This invention comprises a pair of horizontal tracks on which a pressure apparatus can be moved to position said apparatus in any desired place. Further, it comprises an apparatus in which the presssure means can be lowered or raised to exert horizontal pressure at a desired elevation within the limits of the machine. A further object of this invention is to provide hydraulic means which may be moved from a vertical pressing means to a horizontal pressing means and vice versa. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

Figure 5:
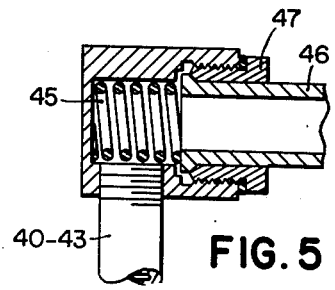
Figure 10:
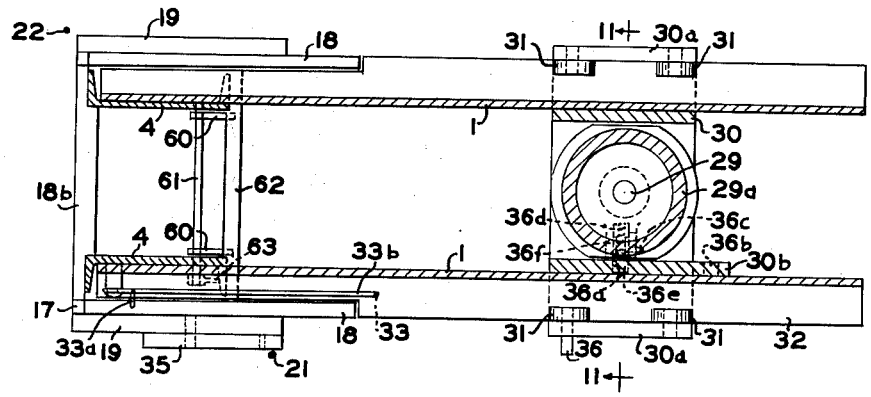
Figures 11, 12:
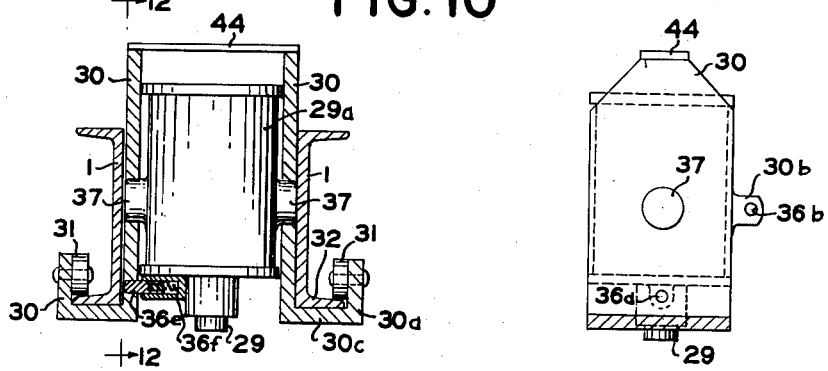
Figure 13:
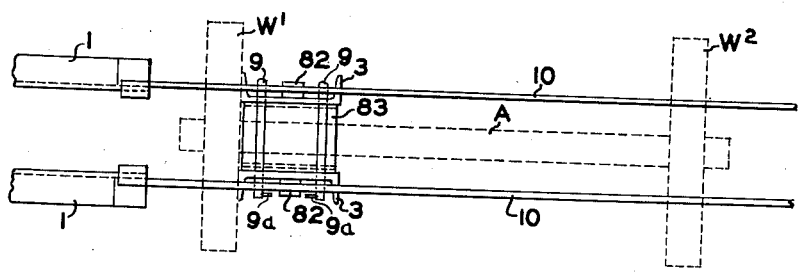

In the drawings annexed hereto and forming a part hereof,

Fig. 1 is a fragmentary side elevation;
Fig. 2 is a plan view of the structure shown in Fig. 1 with parts removed;
Fig. 3 is an end view of this construction;
Fig. 4 is a detailed construction;
Fig. 5 is a detail of a joint of the hydraulic system;
Fig. 6 is a detail view of a pair of fastening pins;
Fig. 7 is a partial plan view of the structure shown in Fig. 6;
Fig. 8 is a partial section taken along the plane indicated by the line 8—8 in Fig. 6;
Fig. 9 is a partial section taken from the right of Fig. 6;
Fig. 10 is a plan section of Fig. 1 taken between the flanges of the upper side rails;
Fig. 11 represents a cross-section of the upper rails taken substantially along the plane indicated by the line 11—11, in Fig. 10;
Fig. 12 represents a longitudinal section taken substantially along the plane indicated by the line 12—12, in Fig. 11; and
Fig. 13 illustrates removal of wheels.

Reference will now be made in greater detail to the annexed drawings for a more complete description of this invention. The frame comprises upper and lower beams or frame members 1 and 2 and vertical beams or end members 3 and 4. There are also bottom bars 5 and end bars 6. The members 3 and 6 are spot welded together. Because of the necessity for extending the length of the machine, the bars 5 are bolted to sections 4 and the bars 10 are bolted to sections 1 which are extended a considerable distance to the right to allow for pressing long shafts into or out of gears or wheels. Bars 5 provide tracks for the wheels 8, and the pins 9 hold the upright members 3 in a fixed and immovable relation to the extension bars 5 and 10. Members 3 can be moved to the right a desired distance from the hydraulic ram 29. The pins 9 can be inserted into any one of a plurality of perforations 14 in the members 5 and 10 and into corresponding perforations in the members 3. The pins 9 are fastened together in pairs, as shown in Fig. 6, by tie-members 9a, there being preferably three pairs of pins 9. The perforations 14 for the pins 9 and 15 are the same distance apart.

The ends of the bars 5 and 10 are secured together by uprights 13, and these bars 5 and 10 are provided along their length with holes 14. The beams or end members 3 can be moved lengthwise of the bars or tracks 5 on the wheels 8 after the pins 9 have been removed. The bars 6 may be disconnected from the member 2 by removing the pins 15 which are identical with the pins 9. When the bar 6 has been moved to the desired position, the pins can then be put into the holes again. It is understood that the frame members are duplicated on the second side, as shown in Figs. 2 and 3, 6 and 7.

There is an elevator 16 at one end of the frame which comprises vertically slidable cross-members 18a and 18b, end members 17, track sections 18, cross-member 62, and braces 19. Additional braces, comparable to the braces 19, may connect the end members 17 diagonally with the track section 18 to furnish added rigidity to the frame. Connected to the braces 19 are lift elements 20 to which cables 21 and 22 are attached. The elevator 16 is a frame surrounding and slidable on the upper ends of uprights 4.

A hydraulic cylinder 29a is carried between a pair of supporting members 30, each having frame edge members 30a extending outwardly and upwardly and provided with rollers 31 which roll on tracks 32 which are furnished by the lower flanges of the upper side members 1. The lower flanges or tracks 32 have continuations 18 which have heretofore been mentioned as track sections. As the supporting members 30 move to the left, they strike the stops 33, which extend through openings in the tracks 32, these openings being shown at 34. The stops 33 are angular extensions from the elongated levers 33b provided near their pivots with lifting arms 33a which are engaged by the track sections 18 as the hydraulic cylinder 29a is lifted. The stops 33 are long enough to extend through the tracks 32 to serve as stopping means for the horizontally extending parts 30c of plates 30. A plate 30 has a horizontally extending lug 30b provided with an opening 36b. A second opening 36a serves to lock the hydraulic cylinder 29a against turning. A horizontal lug 36f is mounted on the underside of the hydraulic cylinder 29a and has a hole in which a plunger 36e is mounted for extension outwardly into either opening 36a or 36b. The plunger 36e is provided with an actuating pin 36c whereby the spring 36d can be compressed to release the cylinder 29a for rotation in a vertical plane on its trunnions 37. The stops 33 prevent the supporting members 30 and the hydraulic cylinder supported thereby from leaving the tracks 32 when the track sections 18 of the elevator are not in line with tracks 32. As shown in Fig. 1, the elevator 16 is in position so that the hydraulic cylinder can be moved to the left. Lifting the stops 33 out of stopping position permits the hydraulic cylinder to take a position on the track extensions 18. When this takes place, the pivoted hook 35 drops down over a pin 36, and this holds the hydraulic cylinder and its supporting members from moving lengthwise of the track sections. When the supporting members 30 and the hydraulic cylinder are in vertical position, a pin 36e may be withdrawn from the hole 36a. This permits rotation of the hydraulic unit. Conversely, the pin 36e may be allowed to occupy the hole 36b. A bar 44 rigidly connects the supporting members 30 to make a rigid structure.

The weight of the hydraulic cylinder and the elevator is sufficient to lower them into the dotted line position shown in Fig. 1. The hydraulic cylinder is mounted on a pair of trunnions 37 and may be turned to a vertical position, as shown by solid lines in Fig. 1, or to a horizontal position, as shown by broken lines in this figure.

The pipes 40, 41, 42, and 43 may be turned, as shown in Fig. 1, and will permit the hydraulic cylinder to change to various positions. The type of joints between the pipes is shown in Fig. 5. As shown in this figure, the spring 45 holds the pipe 46 against the gland 47 and prevents leakage between the pipe 46 and the gland 47. The pipes 40 to 43 may turn about the axis of the pipe 46.

The cables 21 and 22 pass over pulleys 50, 51, 52, and 53 and are connected at one end to the lift elements 20 and at their second end to the head 24. Therefore, when the rod 25 is forced down, the cables 21 and 22 cause lifting of the elevator 16.

There is sufficient space around the upper end of the rod 25 to permit escape of air between the piston 26 and the cylinder 28 and allow downward motion of the piston when the oil is permitted to enter the upper end of the cylinder 28. The cupwasher 27 is engaged by the oil forced in by the pump, not shown.

To control the flow of oil, there is a valve 55 which entirely shuts off the flow of oil in one position but permits the flow of oil to the cylinder or the return of oil from the cylinder to the reservoir. Pipe 56 carries the oil from the pump to the cylinder, and pipe 57 carries oil from the cylinder to the valve 55 and return pipe 58. In the position shown in Fig. 3, all the valve openings are closed. With the handle 59 down in horizontal position, the oil is fed through the pipes 56 and 57 to cause the piston 27 to be depressed. With the handle turned up, the oil can be forced by the weight of the hydraulic unit and the elevator through the pipes 57 and 58 down to the reservoir.

The lower frame member is held to the upright frame members by a plurality of pins and may be raised to get it closer to the hydraulic unit when it is too far from it. There is a plurality of holes 15 in the members 6 and 4 so that the pins may be put into them when the lower member is raised. A pair of pawls 60 are pivotally mounted with a shaft 61 and are arranged to engage a bar 62 to prevent the elevator 16 from going down when it is not intended that it should. Stop arms 63 and 65 are mounted on the shaft 61 and alternately engage the inner face of the flange on the vertical beam 4, in controlling the travel of the pawls 60. The stop arm 65 also serves as a hand lever to swing the pawls clear of the elevator. The hydraulic ram 29 must be in a vertical position when lowered or raised to avoid interference with the shaft 61.

The elevator 16, comprising the bars 17, 18, 18a, 18b, and 62 may be raised and lowered on the vertical beams 4, around which the cage or elevator 16 extends. The shaft 61 and the hand lever 65 are mounted in the beam 4 deep enough so that they are not engaged by the track 18 as it moves up and down. The bottom of the carriage for the hydraulic unit 29 clears the cross-bar 62 when the carriage goes out to a position to be lowered. The stop arm 63 is inside of the track section 18, and, hence, it is not engaged by the flange 30a.

When the stop 33 is completely down, it extends through opening 34 in track 32, and the projecting lower end of the stop 33 serves as a stop for the hydraulic unit. When the hydraulic cylinder 29a is moved out on the track 32 and engages the stop 33, it stops and then, when the stop 33 is raised, the hydraulic cylinder 29a may be moved to the left on the auxiliary tracks 18.

When the carriage 16 is down, as shown in dotted lines in Fig. 1, it may be raised and, after the hydraulic ram 29 has been moved to a vertical position, it strikes, when rising, the pawl 60 and takes it out of the way of the carriage 16 which strikes projection 33a, forming part of the stop 33 which is moved out of opening 34. When the elevator ascends, it passes the pawl 60 and pushes this out of the way. The pawl 60 drops into the path of the elevator 16, when that has gone by. Since pawl 60 is normally in the way of the elevator, except when it is pushed out of the way, it serves as a stop for the elevator, when it is moved to the right.

It should be noted that, when the hydraulic cylinder 29a travels to the left in Fig. 1, it is stopped by the stop 33 and, when released by lifting the stop 33, it proceeds until it is stopped by engagement with the vertical beam 4.

When it is desired that a shaft A be removed from a plurality of wheels W¹ and W², the end members 3 may be moved lengthwise of the members 10 to the position shown by broken lines in Fig. 7. Then the shaft is inserted. Now the shaft A is placed lengthwise of the frame and the wheel W¹ is placed crosswise, resting against the member 6a which has been brought up to normal position, as shown in Fig. 6, where it is held by pins 9, which pins are tied together by bars 9a. Ears 82 are provided on the bar 3 which prevent the bar from tipping over. The frame member 1 is slotted for engagement by a loop 85 on the member 6a. It is apparent from Figs. 1 and 6 that the flanges of the members 3 are cut away at the ends to allow the members 3 to get close to the bars 10. A plate 83 has its edges bent down, as shown in Fig. 9, to hold the members 3 in place. An ear 84, comparable to the ear 82, holds members 3 apart. The plate 83 is secured to the member 3 and is hooked at the top over the ear 84. At the bottom of the members 3 is a similar plate 83 which is hooked under the ear 84. The rollers 8 enable the member 3 to be rolled into place.

Fig. 13 shows a method of detaching wheels from axles or shafts. In Fig. 13, a pair of uprights 3 are shown as detached at their upper ends from the rails or extension bars 10, and they are then moved along the rails. Then one upright 3 is disconnected from the other and a wheel and axle assembly A is put on the rail 7. The removed upright is then put back in place again when the horizontal pressure can be applied, as will be obvious.

It is of course understood that the specific description of structure set forth above may be departed from without departing from the spirit of this invention as disclosed in this specification and as defined by the appended claims.

Having now described my invention, I claim:

1. A press comprising a frame having vertical frame elements and upper and lower horizontal frame elements, the upper horizontal frame elements comprising a pair of tracks for the transportation of a press element having a ram which may exert pressure downwardly when the press element is on the said upper horizontal frame elements, one of said vertical frame elements comprising a pair of elevator guides for the transportation of said press element, the press element being shiftable from the upper horizontal frame element to the vertical frame element and, when so shifted and lowered, being in a position to exert horizontal pressure, the pressure element having trunnions on which it may be turned from a position to press vertically to one in which it may press horizontally.

2. A structure as defined by claim 1 having conduits for conveying oil to and from the press element.

3. A structure as defined by claim 1 having in the upper horizontal frame element a part which may be lowered, cables for raising and lowering part of the horizontal frame element and with it the press element, and power means for raising and lowering said part of the frame element.

4. A press for horizontal and vertical operation comprising horizontal tracks and vertical guide members, one pair of the horizontal tracks having a section which may be raised and lowered, and a press element movable on the upper horizontal tracks, said press element having a hydraulic ram for exerting pressure and, when used on the said upper horizontal track, being capable of exerting vertical pressure, the press element, when on the said section, being movable vertically and, after having been moved downwardly, being capable of exerting horizontal pressure, the press element having a vertical element serving as an abutment for cooperation with the horizontal press element.

5. A structure as defined by claim 4 having an extension for the horizontal frame element serving as a remote abutment.

6. A structure as defined by claim 4 having a hydraulic system comprising pipes connected therewith whereby hydraulic pressure may be supplied for raising and lowering the said section of the horizontal track.

7. An improvement in a hydraulic press machine comprising a carrier having bearings, a frame supporting said bearings, a hydraulic cylinder supported by said carrier, said cylinder having a ram protruding therefrom for the purpose of exerting pressure, trunnions on both sides of said cylinder mounted in the bearings so that the cylinder may be rotated in the bearings in a vertical direction, said frame having tracks on which the carrier is supported, said carrier being provided with wheels on which it is supported on the tracks for movement in a horizontal direction, an elevator having rails which are a continuation of the tracks forming part of the frame, vertical guides for the elevator, means for raising and lowering the elevator, said press frame having a vertically stationary section, a pivoted stop for arresting movement of said carrier along the frame and prevent the carrier from moving into the space normally occupied by the elevator unless the stop is rendered inoperative, and locating means to hold the hydraulic cylinder in the carrier in a position to exert pressure either horizontally or vertically.

8. A structure as defined by claim 7, further characterized by two vertical supporting members with openings for attaching horizontal members and horizontal supporting means with openings in the ends thereof for the insertion of holding pins to tie the horizontal members and the vertical members.

References Cited in the file of this patent

UNITED STATES PATENTS

| Number | Name | Date |
|---|---|---|
| 504,030 | Gordon | Aug. 29, 1893 |
| 638,532 | Weaver | Dec. 5, 1899 |
| 908,381 | Bennett | Dec. 29, 1908 |
| 1,256,073 | Stevenson | Feb. 12, 1918 |
| 1,267,492 | Young | May 28, 1918 |
| 1,303,714 | O'Brien | May 13, 1919 |
| 1,510,167 | Wilhelm | Sept. 30, 1924 |
| 1,571,622 | Briggs | Feb. 2, 1926 |
| 1,614,769 | Amsler | Jan. 18, 1927 |
| 1,624,160 | Craig | Apr. 12, 1927 |
| 1,977,423 | Blazek et al. | Oct. 16, 1934 |
| 2,028,391 | Harnischfeger | Jan. 21, 1936 |
| 2,226,029 | Taylor | Dec. 24, 1940 |
| 2,353,221 | Clifton et al. | July 11, 1944 |
| 2,391,885 | DeShields | Jan. 1, 1946 |
| 2,395,046 | Grover | Feb. 19, 1946 |
| 2,502,072 | Bender | Mar. 28, 1950 |